United States Patent [19]

Slocum

[11] 3,724,706
[45] Apr. 3, 1973

[54] EXPLOSION PROOF JUNCTION BOX
[75] Inventor: Fred H. Slocum, Pittsburgh, Pa.
[73] Assignee: Robroy Industries, Verona, Pa.
[22] Filed: Aug. 30, 1971
[21] Appl. No.: 175,916

[52] U.S. Cl. ............ 220/3.8, 137/525.1, 174/17 UA, 174/50, 174/65 R, 215/56, 220/44 R
[51] Int. Cl. ........ Ho2g 3/08, B65d 51/16, H02g 3/18
[58] Field of Search ....220/3.2, 3.8, 3.92, 3.94, 44 R, 220/44 A, 46 R; 174/17 UA, 50, 65 R; 215/56; 137/525.1, 525.3

[56] References Cited

UNITED STATES PATENTS

| 3,141,586 | 7/1964 | Wetterek | 215/56 |
| 3,189,210 | 6/1965 | Heisler | 220/44 R |
| 3,343,710 | 9/1967 | Wehle et al. | 220/44 A |
| 3,073,888 | 1/1963 | Wesseler | 220/3.8 |

Primary Examiner—Joseph R. Leclair
Assistant Examiner—Allan N. Shoap
Attorney—Stanley J. Price, Jr.

[57] ABSTRACT

An explosion-proof and corrosion resistant junction box for electrical connection junctures and the like including a cap portion having a downwardly extending external screw portion, and a body portion having an internal screw portion. Both cap and body portions have a resilient, moisture resistant, polymeric coating bonded to the metal substrate. The cap and base portion coatings terminate in downward and upwardly extending relatively flexible flanges around their respective peripheries. The respective coated portions are adapted to threadably engage whereby the flange portions come into contact to provide an effective one-way vapor seal, and whereby the screw portions provide a path for gases from within to without the junction box. Hot gases under pressure within the junction box may pass along the path in said screw portions and through said one-way vapor seal, and, in so doing, become cooled to thereby prevent ignition or explosion of atmospheric gases near the junction box. The flange portions provide an effective moisture and vapor seal whereby corrosive vapors are prevented from corroding the outside surfaces or entering the junction box.

7 Claims, 5 Drawing Figures

EXPLOSION PROOF JUNCTION BOX

BACKGROUND OF THE INVENTION

1. Field of the Invention

This invention relates to a junction box for electrical connection or the like, and more particularly to an explosion-proof, corrosion resistant junction box.

2. Description of the Prior Art

It is well known that explosion hazards exist in many industrial atmospheres. Typical explosion hazards exist where explosive gases such as acetylene, hydrogen, ether, gasoline, naphtha vapors, or the like, are present, and where a combustible dust is present, as in a chemical spray drying area. In order for a fire or explosion to occur, a sufficient amount of inflammable vapors or combustible dust must be present, a sufficient amount of combustion supporting gas, such as air, must be present, and finally, an energy source must be present to ignite the explosive mixture. Unfortunately, all too often, the required energy source for ignition is found in electrical equipment or connections, and explosions within an electrical conduit have caused general explosions in the surrounding area. Thus, it has become necessary to provide explosion-proof electrical connections, such as junction boxes and the like, to prevent the energy for explosive ignition from escaping into the combustible atmosphere or explosive atmosphere. Explosion-proof electrical apparatus, such as a junction box, are designed and manufactured strong enough to contain an explosion and to prevent the escape of flame or excess heat that could ignite the surrounding atmosphere. Such apparatus have not been gas tight, but have been designed to allow the controlled escape of gases. Certain electrical apparatus, such as junction boxes, have been proposed having a ground joint or porous metal component for permitting controlled escape of gases. Those devices, though providing a somewhat satisfactory explosion-proof apparatus, in some instances must be coated against corrosion when exposed to certain corrosive vapors. Where the junction box is coated after installation, the gas escape passages are sealed by the coating. Where the junction box is precoated prior to installation and provisions are made for the escape of gas from the junction box, portions of the threads remain exposed to the corrosion vapor.

This invention provides an improved junction box for electrical connections that is both explosion-proof and corrosion proof. Moreover, the invention provides an improved junction box of the type described which is corrosion resistant under substantially all conditions, and which will effectively prevent corrosive vapors or dust from corroding threads and reaching electrical components within the junction box. Moreover, the invention provides an explosion-proof junction box which will permit hot gases under pressure within the junction box to escape therefrom in a manner whereby those gases are effectively cooled and the pressure effectively dissipated while preventing corrosive vapors from corroding threads and entering the internal portion of the junction box.

SUMMARY OF THE INVENTION

This invention provides an explosion-proof junction box for electrical connection junctures, and the like, including a body portion and a cap portion adapted to be threadably engaged thereto. Preferably, the cap portion has a downwardly extending external threaded portion, and the body portion has an internal threaded portion for receiving said downwardly extending external threaded portion of the cap. Both the cap and body portions have a resilient, moisture resistant polymeric coating, preferably a polyvinyl chloride (PVC) coating. The cap and body portion coatings terminate respectively in downwardly and upwardly extending flanges around their respective peripheries. The coated portions are adapted to be threadably engaged whereby the flange portions come into sealing contact to provide an effective seal for the threaded portions of the junction box against the corrosive vapors and yet provide a path for gases to escape from within the junction box. Should an explosion occur in an electrical conduit, the hot gases under pressure within the junction box may pass along the path in said screw portions and through said one-way seal.

DESCRIPTION OF THE PREFERRED EMBODIMENTS

Figure 1:
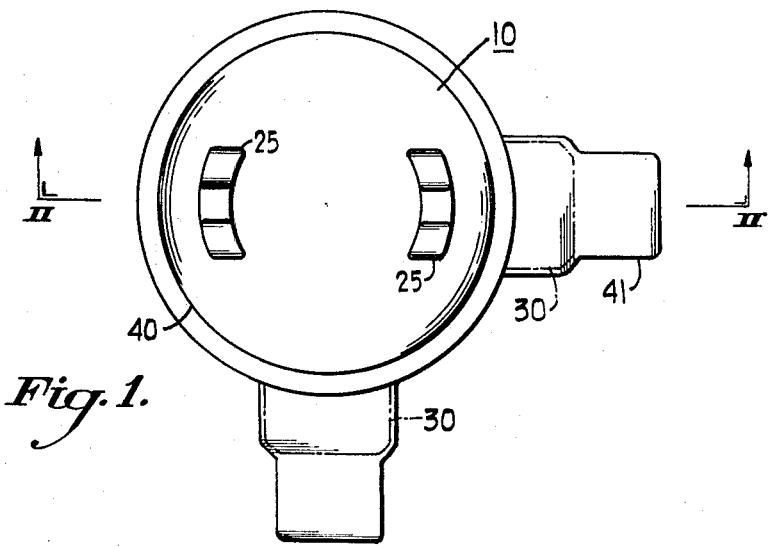
FIG. 1 is a top plan view of a junction box according to the invention.
Figure 2:
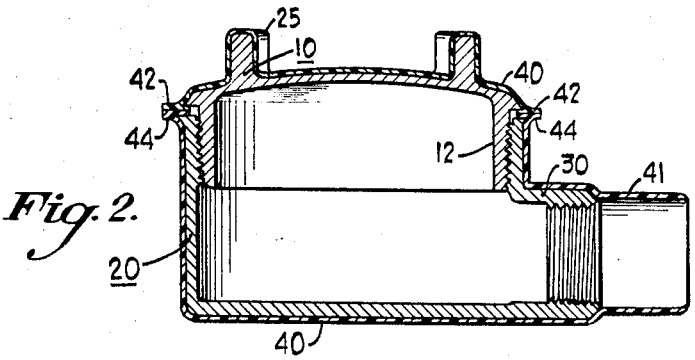
FIG. 2 is a sectional view taken along the line II—II of FIG. 1.

Referring now to FIG. 1 and FIG. 2, a junction box according to the invention is shown having a cap portion 10 and a body portion 20. Body portion 20 has one or more internally threaded pipe-coupling members 30. Coupling members 30 are adapted to threadably receive and threadably advance wire-carrying conduit pipe (not shown) for bringing electrical wires into the junction box of the invention.

Both cap portion 10 and body portion 20 are provided with a moisture resistant polymeric coating 40. Coating 40 preferably comprises a moisture proof, chemical resistant, impact resistant polymeric composition. Most preferably, coating 40 comprises a polyvinyl-chloride coating (PVC), but equivalent compositions may be employed. For example, impact resistant nylon, polypropylene, polyurethane, or polyethylene coatings are suitable. Coating 40 protects cap 10 and body 20 portions of the junction box from corrosion damage due to corrosive vapors.

Coating 40 extends beyond the respective peripheries of cap portion 10 and body portion 20 and thereby forms flanges 42 and 44 respectively thereon. Each of the flanges thus formed is a pliable, resilient flange owing to the impact resistant characteristic polymeric coating 40. Most preferably, flange 42 on cap portion 10 extends downwardly, while flange 44 on body portion 20 extends upwardly for reasons more fully explained hereinafter. In addition, coating 40 preferably extends beyond coupling member 30 for providing a moisture resistant sleeve 41 for sealably engaging a conduit pipe in member 30. In that manner corrosive vapors are prevented from entering the junction box of the invention through conduit coupling connections.

Figure 5:
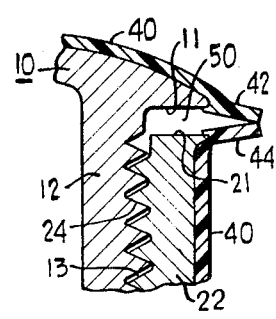
FIG. 5 is a view of the threaded joint in a junction box illustrating the preferred construction of the resilient flange seal according to the invention.

Cap portion 10 is provided with a downwardly extending external threaded portion 12, and body portion 20 is provided with an upwardly extending internal threaded portion 22. Thus the polymer coated cap and body portions may be threadably engaged through threaded portions 12 and 22 in a manner whereby cap portion 10 may be downwardly (as shown) advanced into body portion 20. Lugs 25, or the like, may be provided for aiding in turning cap 10 within body portion 20. Advancing of cap portion 10 into body portion 20 is continued at least until flange portions 42 and 44 on the respective peripheries of cap portion 10 and body portion 20 come into sealing contact. In that fashion an effective resilient, corrosive vapor seal is provided for the junction box of the invention. The seal formed by flanges 42 and 44 will effectively prevent the entry of corrosive vapors into the junction box to thereby protect the threads from corrosion by the corrosive vapors. In the most preferred form of the invention shown in FIG. 5, flanges 42 and 44 are downwardly and upwardly extending, respectively, whereby a resilient seal is formed having a rather broad sealing surface. As best shown in FIG. 5, threadably advancing cap portion 10 downwardly into body portion 20 will cause ever increasing portions of the contacting surfaces of resilient flanges 42 and 44 to come into contact in sealing relationship.

Figure 4:
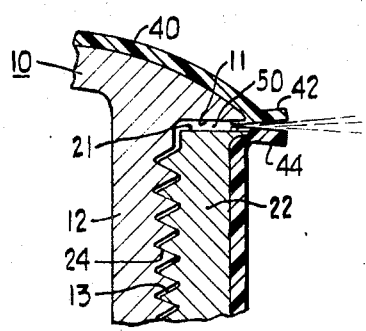
FIG. 4 is a view of the threaded joint according to the invention wherein gases are escaping from the junction box.
Figure 3:
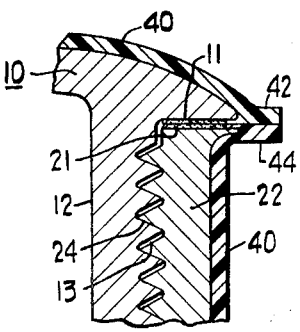
FIG. 3 is a more detailed view of the threaded joint between the junction box body portion and cap portion illustrated in FIG. 2.

Cap portion 10 and body portion 20 are adapted to be threadably engaged whereby their respective threaded portions 12 and 22 provide a path for gases from within to without the junction box. As shown in FIG. 3, downwardly extending external threaded portion 12 of cap portion 10 includes threads 14, and upwardly extending internal threaded portion 22 of cap 20 includes threads 24. Threads 14 are somewhat smaller in dimension than are threads 24. For that reason, advancing cap 10 into body portion 20 whereby a seal is formed between respective flanges 42 and 44 of those members, and whereby said cap is "tightened" in said body, will cause abutting of the respective thread portions 14 and 24 in a manner whereby a gap 13 is provided therebetween. In that fashion a helical path along gap 13 is provided through which gases within the junction box may pass. It should be noted here that threads 12 and 14 may be scored along the outer edges thereof for providing an additional escape path or paths for gases within the junction box. Scoring or grinding of the uppermost (as shown) thread is especially preferred. While passing along the helical path, hot gases are effectively cooled by contact with the cooler metal threads. After traveling the entire course of threads the hot gases may pass without the junction box through the seal between flanges 42 and 44 as shown in FIG. 4. As will be recalled, flanges 42 and 44 comprise a resilient material and internal gaseous pressure will cause the seal to break, as is shown, thereby allowing the gases to escape to the surrounding atmosphere. It should further be noted that work, in a physics sense, is required of the hot gas to open the seal. The work required necessarily reduces the energy content, and hence temperature, of the hot gases to a degree. Moreover, the rapid expansion of the hot compressed gas after passing through the seal into the atmosphere will further tend to cool gas passing through the seal. After atmospheric pressure outside the seal is greater than or equal to the pressure within the junction box, plus the pressure required to break the seal between flanges 42 and 44, the resilient seal again closes to prevent vapors or dust from entering the junction box.

In the embodiment shown in FIG. 3 the surface of a cap flange portion 11 and the surface of a body flange portion 21 are ground or roughened. In that fashion a passageway comprising an abutting ground surface joint between cap flange 11 and body flange 21 is provided through which gases may pass. In the alternative, the flange surfaces need not be ground so long as a passageway, such as passageway 50, is provided through which gases may pass to the seal formed of flanges 42 and 44 (FIGS. 4 and 5). In an additional alternative, a porous metal ring (not shown) may be provided between cap portion 10 and body portion 20 through which gases may pass and be further cooled thereby. Both the ground flanges and the porous metal ring are protected against the corrosive vapors by the flanges 42 and 44.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. An explosion-proof junction box for electrical connection junctures, or the like, including a cap portion and a body portion, said cap and body portions having a resilient, moisture resistant polymeric coating, said coating extending beyond the respective peripheries of said cap and said body portions whereby respective resilient flanges are formed thereon, said cap and body portions including threaded portions for threadably advancing said cap portion into said body portion whereby said resilient flange portions come into sealing contact to provide an effective one-way vapor seal for said junction box to prevent the flow of corrosive vapors into the threaded portions of said cap and body portions and permit the outflow of gas from said junction box through said threaded portions.

2. The explosion-proof junction box as set forth in claim 1 wherein said respective resilient flange portions comprise a flange portion extending generally downwardly of said cap portion and a flange portion extending generally upwardly of said body portion.

3. The explosion-proof junction box as set forth in claim 2 wherein said polymeric coating comprises a polyvinylchloride film coating.

4. The explosion-proof junction box as set forth in claim 3 wherein said threaded portions comprise an external threaded portion extending downwardly of said cap portion and formed integrally thereof, and an internal threaded portion formed integrally of said portion.

5. The explosion-proof junction box as set forth in claim 4 wherein said external threaded portion and said internal threaded portion include respective helical threads having differing dimensions.

6. The explosion-proof junction box as set forth in claim 5 wherein said cap and body portions include respective cap flange and body flange portions, and wherein said cap flange and body flange portions may abut, each of said cap flange and body flange portions having a ground surface for providing a passageway through which gases may pass between said ground and abutting surfaces.

7. The explosion-proof junction box as set forth in claim 1 wherein said body portion includes one or more pipe coupling members extending therefrom for receiving a wire bearing conduit, and wherein said coating extends beyond each of said coupling members for providing a moisture resistant sleeve for sealably engaging said conduit.

* * * * *